Patented Sept. 25, 1934

1,974,938

UNITED STATES PATENT OFFICE 1,974,938

DRY YEAST AND METHOD OF PREPARING THE SAME

John Raymond White, New York, N. Y.

No Drawing. Application January 2, 1931, Serial No. 506,312

8 Claims. (Cl. 99—10)

This invention relates to the method of preparing dry yeast and the resultant product.

Dry yeast, as an article of commerce, is so prepared for purposes of shipment for great distances, where this article cannot be conveniently prepared, and especially in shipment to tropical climates because a large quantity of moisture would tend to cause the yeast to readily decompose and mold and spoil.

Dry yeast as at present known to me having a moisture content of 11%, or less, is substantially free from any tendency to mold, but is objectionable in addition to being difficultly soluble.

A dry yeast with a moisture content of 11% or less loses its strength within short periods of time, because nutrients are not assimilable with this reduced moisture content, in addition to the objections as to its physical qualities of difficult solubility. Yeast with increased quantities of moisture to and about 16%, in which condition, yeast is readily soluble and will maintain its vital qualities, cannot be kept in storage unless by special means, for any period of time without spoiling or forming mold.

It is an object, therefore, of my invention to provide a dry yeast product which may be dehydrated to about 11% moisture content, whereby its vital force will be maintained fairly indefinitely.

It is a further object of my invention to produce a yeast product whereby the moisture content may be increased substantially whereby the yeast will be readily soluble, and the vitalized qualities of the yeast will be retained indefinitely without the possibility of having the yeast mold or spoil when kept in storage for indefinite periods, and under ordinary climatic, atmospheric conditions.

It is a further object of my invention to provide a dry yeast product characterized by a reduced moisture content of as low as 11%, or as high as 16% and over, which is free from added components, particularly, absorbents, which objectionably modify the qualities of the yeast and provide one containing such increased moisture content above 11% which would normally support mold, but otherwise renders the yeast readily miscible or becomes dissolved in the water necessary for the baking operation, and to provide such a product which is characterized by freedom from mold, tendency towards liquefication in storage and retention of the vital qualities of the yeast for indefinite periods of storage.

I have discovered that by the addition of a difficultly soluble organic compound, preferably one which has mucic acid as the base thereof, to the yeast, that the yeast may be dehydrated to various degrees of moisture content to and including about 11%, and as high as 16% moisture, to thereby provide a substantially dry yeast and that the yeast under these conditions will, with the lower moisture content indicated, and even if the moisture content be retained above 11% and higher than 16%, be free from deterioration and any tendency to form mold or to become otherwise spoiled in storage. Yeast having a moisture content of 16% and higher, with the difficultly soluble organic acid or its compounds will not liquefy in storage, but will nevertheless be readily soluble when mixed with the water content necessary in preparing the dough batch.

In my prior application, S. N. 263,969, patented September 24, 1929, Patent No. 1,729,409, I have described and claimed a dough composition and process of making the same, involving briefly the addition of mucic acid or mucic acid compounds, such as the compounds formed by mucic acid and the alkalies such as the alkali metals or the alkaline earth metals, as additions to yeast, and the process of making yeast with these compounds by adding the same to the yeast during a fermentation step. It is preferred by me, in the preparation of a dry yeast, to utilize the yeast and the yeast product as prepared and described in my said aforementioned patent. The yeast or the yeast mixtures as described in my said aforementioned patent, which comes from the press with about 65% moisture, or with a moisture content of 61 to 70%, is dehydrated by suitable means, such as vacuum drying, preferably maintaining a reduced temperature to prevent fermentation until the moisture content has been reduced to about 16% or as low as 11%, depending upon the character of drying desired. Other forms of drying, such as by circulating large volumes of air while maintaining low temperatures, may also be used.

As indicated above, it is preferred that the yeast have incorporated in it, about .015 to 2.25% mucic acid, or preferably about 2% mucic acid, either as mucic acid or the alkalies such as alkali metal or alkaline earth metal salt of mucic acid and assimilate this component in the last fermentation, or mash step, and then recover the yeast so treated by pressing until the water content is about 65%. Dehydration may then be effected until the moisture content is reduced to about 11%, and as high as 16%.

Where ordinary molded yeast, which is provided on the market with about 68% to 70% moisture is used, I may incorporate 1.7% of the organic acid or the organic acid compound previously enumerated with the yeast and then dehydrate in the manner aforementioned to reduce the moisture content of the mixture until the yeast is thoroughly dry and contains from 11 to 16%.

Where it is desired to have a thoroughly dry yeast with a reduction in moisture content to just about where the yeast cell would be devitalized if dehydration were continued, the dehydration is carried out until the moisture content has been reduced until about 11%.

The product as made by me with this reduced moisture content will remain vitalized for indefinite periods, as the concentration effected by dehydration will leave enough assimilable ingredients to act as a food for the yeast. The concentration occasioned by dehydration will serve to precipitate the acid or the acid compound without any tendency to objectionably affect the yeast, or to liquefy the same when maintained in storage. Accordingly, it is contemplated by me to use an organic acid or an organic acid compound, which is difficultly soluble, and upon concentration due to drying while precipitated in the mixture of yeast forming the starting material, upon the dehydration to the point indicated.

Where the moisture content is reduced only as low as about 16%, this moisture content which would normally be sufficient to support the formation of mold and cause deterioration, will when in the presence of the precipitable, organic acid or organic acid compounds, preferably those of mucic acid, serve to retain the yeast in the dry form for indefinite periods of time without deterioration, in addition to providing a yeast which is readily soluble in the water necessary for forming the dough batch. This I attribute to the fact that the yeast, as a vitalizing water content, makes the assimilation of the mucic acid where this is used, available to retain its full vitalized quality.

Though I have described the direct addition of mucic acid or the mucic acid compounds directly to a wet yeast as the starting material for preparing a dry yeast, the mucic acid or mucic acid compound, generated yeast in my aforementioned patent is preferred as the starting material, and this material whether dehydrated to 16% or 11% has, as the result of the assimilated mucic acid or mucic acid compound, enough food to maintain the yeast alive under all normal atmospheric conditions, and particularly in tropical climates, without spoiling or formation of mold, even though the mucic acid is apparently almost insoluble in the liquor of the last fermentation step in the process of producing it.

Though I have described the dehydration of the yeast as preferably to 11% where a thoroughly dry yeast is desired, and up to 16% where a readily soluble yeast is desired, it will be observed that I may dehydrate the yeast to include higher percentages of moisture, and where the process is so practiced, it is preferred to include the higher percentages of mucic acid or its compound, or of such precipitable or difficultly soluble organic acids, or their compounds, as described. With these higher percentages of the compound so added, the moisture content of the yeast may be increased to assure the retention of the product in storage, free from decomposition, formation of mold, or other deteriorations.

I may still further render the yeast as prepared by me, of a character to more rapidly activate the yeast, and thereby also more rapidly mature the dough batch, and even though dried to the minimum water content without the addition of revivifying agents, such as sugar, and without special steps necessary in preparing dry yeast as known to me, which requires a prefermentation step before actual use. This I may accomplish by adding to the dried yeast, from .005 to .75% of ingredients containing a halogen-oxygen acid radical. The particular substances containing the halogen-oxygen acid radicals may be iodic acid, bromic acid, sodium or potassium bromate, sodium iodate, calcium bromate, and iodate, or mixtures thereof, and while I prefer the potassium salt containing the halogen-oxygen acid radical, the halogen-oxygen radical derivatives of the alkali metals and/or the alkaline earth metals may be employed. I may also include, instead of the alkali metal derivatives or the alkaline earth metal derivatives, the ammonia compounds of these halogen-oxygen acid compounds.

While in my prior Patent No. 1,729,409, granted September 24, 1929, I have referred to the addition of inorganic compounds containing a halogen-oxygen acid radical, as added to the yeast during the fermentation thereof, as desirable for the purposes therein set forth, I may for purposes of preparing a dry yeast and avoiding the burden of the prefermentation step or activation of the yeast, add these inorganic salts just prior to the reduction of the moisture content of the yeast. It is further preferred by me to incorporate the inorganic acid compounds containing a halogen-oxygen acid radical into the yeast after the water content of the yeast, as it comes from the press, has been reduced to from 25 to 30% moisture. The yeast in this condition does not have sufficient free moisture present to dissolve the inorganic salts, but has sufficient plasticity to permit ready incorporation of the salts. The free moisture also has been reduced to such an extent to avoid solution of the salts. After intimate incorporation of the desired amount of the inorganic salts, the organic acids described, such as mucic acid or the mucic acid compounds, may be incorporated. However, due to the insolubility of the organic acid or organic acid compounds used, these may be incorporated into the yeast when a higher moisture content is present.

I have previously described, as another form of drying the yeast as herein compounded, any method for reducing moisture content to 16% or as low as 11%, but the preferred method of drying the yeast as compounded by me, containing the organic acid or its compounds, is to circulate large volumes of air over the yeast which has been spread upon relatively flat areas. By this method, temperatures only as low as 50 to 60° F. may be employed, and reduction of the moisture obtained to the desired point without fear of spoilage. This form of drying results in a product which, though pulverulent, does not have the flinty hardness of dry yeast now on the market, and does not require pulverization in a mortar before effecting solution thereof in preparing the dough batch.

The dry yeast as made by me in accordance with the process herein described, requires no greater time for preparation or dissolution in the water than that necessary for making the dough batch from commercially pressed yeast. The organic acid or the organic acid compounds which are insoluble in the water necessary for preparing the dough batch will become readily suspended in the water necessary for dissolving the yeast. The inorganic salts containing the halogen-oxygen acid radicals will become readily soluble, and will activate and mature the dough, with great rapidity, avoiding the revivifying of the yeast, ordinarily necessary with dry yeast.

Having thus described my invention and illustrated its use, what I claim as new and desire to secure by Letters Patent, is:

1. The process of preparing a dry yeast, which includes assimilating about .015 to 2.25% mucic acid in yeast, separating the wet yeast containing about 65% water, and then dehydrating until the moisture content is reduced to material vitalizing quantities of about 16%.

2. The process of preparing a dry yeast, which includes incorporating a mucic acid compound into yeast containing about 65% moisture, and then reducing the moisture content of the yeast with the mucic acid compound in situ, until a moisture content of about 16% is obtained.

3. The process of preparing a dry yeast, which includes dehydrating wet yeast, including an insoluble organic acid non-toxic in character, having a degree of insolubility of mucic acid, reducing the moisture content to about 25 to 30%, then incorporating an inorganic compound containing a halogen-oxygen acid radical, and then continuing the dehydration until the moisture content is reduced to about 16%.

4. The process of preparing a dry yeast, which includes dehydrating wet yeast including an assimilated organic acid compound, comprising mucic acid, by circulating large volumes of air over the yeast so prepared, and maintaining the temperatures of from 50 to 60° F., reducing the moisture content to vitalizing quantities of about 16% while maintaining the yeast free from any tendency to form a flinty and hard pulverulent product.

5. The process of preparing a dry yeast, which includes slowly dehydrating wet yeast while avoiding the formation of a hard, pulverulent product, reducing the moisture content to the point where there is no extraneous moisture, but plasticity of the yeast is preserved in the region of 25 to 30%, and then incorporating an inorganic salt including a halogen-oxygen acid radical, reducing the moisture content of the yeast in the presence of a mucic acid compound, and continuing the dehydration until the moisture content of the yeast has been reduced to vitalizing quantities of about 16%.

6. A dry yeast containing a vitalizing moisture content to obtain therein a total moisture content of about 16% and a non-toxic, organic acid compound having a degree of insolubility of mucic acid.

7. A dry yeast containing a vitalizing moisture content of about 16% and a compound of mucic acid.

8. A dry yeast containing a vitalizing moisture content of about 16% and mucic acid.

JOHN RAYMOND WHITE.